(12) United States Patent
Northrop et al.

(10) Patent No.: US 10,085,377 B2
(45) Date of Patent: Oct. 2, 2018

(54) COOLING SYSTEM AND AIR DELIVERY SYSTEM FOR A FARM MACHINE

(71) Applicant: Eaton Corporation, Cleveland, OH (US)

(72) Inventors: Kurt Northrop, Kalamazoo, MI (US); Daniel Ouwenga, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 63 days.

(21) Appl. No.: 15/216,213

(22) Filed: Jul. 21, 2016

(65) Prior Publication Data

US 2016/0324069 A1    Nov. 10, 2016

Related U.S. Application Data

(63) Continuation of application No. PCT/US2015/012237, filed on Jan. 21, 2015.
(Continued)

(51) Int. Cl.
*F01N 3/00* (2006.01)
*A01D 41/12* (2006.01)
(Continued)

(52) U.S. Cl.
CPC .............. *A01D 41/12* (2013.01); *F01N 3/055* (2013.01); *F01P 1/06* (2013.01); *F01P 5/06* (2013.01);
(Continued)

(58) Field of Classification Search
USPC ......... 60/274, 278, 280, 287, 288, 289, 292, 60/293, 295, 296, 298, 307, 315, 316,
(Continued)

(56) References Cited

U.S. PATENT DOCUMENTS 3,748,836 A    7/1973  Bachle
3,820,327 A    6/1974  Henault
(Continued)

FOREIGN PATENT DOCUMENTS

CN    102597456 A    7/2012
DE    10206066 A1    9/2002
(Continued)

OTHER PUBLICATIONS

International Search Report and Written Opinion for International Application No. PCT/US2015/012237 dated May 1, 2015, 12 pages.
(Continued)

*Primary Examiner* — Binh Q Tran
(74) *Attorney, Agent, or Firm* — RMCK Law Group PLC

(57) ABSTRACT

A cooling system for cooling a component on a farm machine according to the present disclosure can include a rotary blower and a manifold. The rotary blower can include a housing and have a first rotor and a second rotor rotatably disposed in the housing. The first and second rotors can have meshed lobes for transporting air from an inlet port to an outlet port. The rotary blower can further include a first rotor shaft and a second rotor shaft rotatably supported by the housing and having first and second rotors, respectively, fixed for rotation therewith. The manifold can direct the air from the rotary blower onto the component of the farm machine.

20 Claims, 9 Drawing Sheets

Related U.S. Application Data

(60) Provisional application No. 61/931,231, filed on Jan. 24, 2014.

(51) Int. Cl.

| | | |
|---|---|---|
| *F01P 1/06* | (2006.01) | |
| *F01N 3/05* | (2006.01) | |
| *F01P 5/06* | (2006.01) | |
| *F02M 35/08* | (2006.01) | |
| *F02B 33/38* | (2006.01) | |
| *F01P 1/00* | (2006.01) | |
| *A01D 41/00* | (2006.01) | |
| *B01D 46/00* | (2006.01) | |
| *F02M 35/16* | (2006.01) | |
| *F02B 37/04* | (2006.01) | |
| *F02B 37/16* | (2006.01) | |

(52) U.S. Cl.
CPC ........... *F02B 33/38* (2013.01); *F02M 35/086* (2013.01); *A01D 41/00* (2013.01); *B01D 46/0068* (2013.01); *F01N 2260/022* (2013.01); *F01N 2590/08* (2013.01); *F01P 2001/005* (2013.01); *F01P 2060/04* (2013.01); *F01P 2060/12* (2013.01); *F01P 2060/16* (2013.01); *F02B 37/04* (2013.01); *F02B 37/164* (2013.01); *F02M 35/164* (2013.01); *Y02T 10/20* (2013.01)

(58) Field of Classification Search
USPC .................................. 60/319, 320, 321, 291
See application file for complete search history.

(56) References Cited

U.S. PATENT DOCUMENTS

| | | | |
|---|---|---|---|
| 3,967,929 A | 7/1976 | Tamazawa et al. | |
| 4,027,478 A * | 6/1977 | Masaki ..................... | F01N 3/18 60/285 |
| 4,564,346 A | 1/1986 | Kimmons et al. | |
| 4,702,756 A | 10/1987 | Yajima | |
| 5,934,235 A | 8/1999 | Astner et al. | |
| 5,987,885 A | 11/1999 | Kizer et al. | |
| 6,358,109 B1 | 3/2002 | Neisen | |
| 7,513,107 B2 * | 4/2009 | Lehmann ................... | F01N 3/32 60/280 |
| 7,913,488 B2 * | 3/2011 | Schick ..................... | F01N 3/023 60/274 |
| 8,429,902 B2 * | 4/2013 | Kondou ..................... | F01N 3/22 60/277 |
| 8,539,769 B2 * | 9/2013 | Hansen .................. | F01C 11/008 123/559.1 |
| 8,813,492 B2 * | 8/2014 | Hansen .................. | F01C 11/008 123/559.1 |
| 9,032,715 B2 | 5/2015 | Bruns | |
| 9,683,521 B2 * | 6/2017 | Mahalatkar ............ | F02M 26/08 |
| 2005/0139198 A1 | 6/2005 | Park | |
| 2011/0083647 A1 | 4/2011 | Hansen et al. | |
| 2011/0138774 A1 | 6/2011 | Pursifull et al. | |

FOREIGN PATENT DOCUMENTS

| | | |
|---|---|---|
| DE | 102010011293 A1 | 9/2011 |
| EP | 0312107 A1 | 4/1989 |
| EP | 1930188 A1 | 6/2008 |
| EP | 2372121 A1 | 10/2011 |
| EP | 2982845 A1 | 2/2016 |
| JP | 05010282 A | 1/1993 |
| JP | H0510282 A | 1/1993 |
| JP | 2005220778 A | 8/2005 |
| JP | 2011214445 | 10/2011 |
| WO | 2005045208 A1 | 5/2005 |
| WO | 2011006844 A1 | 1/2011 |
| WO | 2012167248 A2 | 12/2012 |

OTHER PUBLICATIONS

European Search Report for EP Application No. 15740776 dated Sep. 15, 2017, 7 pages.
European Search Report for EP Application No. 15740047.4 dated Sep. 20, 2017, 8 pages.

* cited by examiner

COOLING SYSTEM AND AIR DELIVERY SYSTEM FOR A FARM MACHINE

CROSS-REFERENCE TO RELATED APPLICATIONS

This application is a continuation of International Application No. PCT/US2015/012237 filed Jan. 21, 2015, which claims the benefit of U.S. Patent Application No. 61/931,231 filed on Jan. 24, 2014. The disclosures of the above applications are incorporated herein by reference.

FIELD

The present disclosure relates generally to farm machines and more particularly to a cooling system and an air delivery system including a supercharger configured on a farm machine.

BACKGROUND

Over time farm equipment manufacturers have been required to meet tighter emission standards. Farm equipment manufacturers have responded to these elevated emission standards by improving farm equipment technology including engine technology. In some instances, a by-product of this improved technology is an engine that ultimately emits exhaust having higher temperatures than previously observed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A cooling system for cooling a component on a farm machine according to the present disclosure can include a rotary blower and a manifold. The rotary blower can include a housing and have a first rotor and a second rotor rotatably disposed in the housing. The first and second rotors can have meshed lobes for transporting air from an inlet port to an outlet port. The rotary blower can further include a first rotor shaft and a second rotor shaft rotatably supported by the housing and having first and second rotors, respectively, fixed for rotation therewith. The manifold can direct the air from the rotary blower onto the component of the farm machine.

According to additional features, the component comprises a turbocharger. In another configuration, the component comprises at least one of an engine accessory, engine oil and engine coolant. In one arrangement, the component comprises a turbocharger and an accessory. The cooling system can further comprise a valve that is selectively actuated by a controller for modifying a ratio of air delivered to the turbocharger and the accessory.

According to other features, the inlet port can extend along an inlet port axis and the outlet port can extend along an outlet port axis. The inlet port axis and the outlet port axis can be parallel. The inlet port can be defined by an inlet cylinder provided on the housing. The inlet port can define a circular cross section. The outlet port can be defined by an outlet cylinder provided on the housing. The outlet port can define a circular cross section. The housing can comprise an eyelet extending therefrom. The eyelet can define an opening having an axis that is parallel to the inlet port axis and the outlet port axis.

According to another configuration the cooling system can include an aftertreatment system. The aftertreatment system can comprise a first aftertreatment enclosure configured on the farm machine and having a first inlet, a second inlet and an outlet. The first inlet can receive engine exhaust from an engine of the farm machine and the second inlet can receive air from the rotary blower. A temperature of the engine exhaust can be reduced upon exiting the first aftertreatment enclosure. In one configuration the farm machine comprises a combine.

An air delivery system for a farm machine constructed in accordance to one example of the present disclosure can include a rotary blower and a manifold. The rotary blower can include a housing and have a first rotor and a second rotor rotatably disposed in the housing. The first and second rotors can have meshed lobes for transporting air from an inlet port to an outlet port. The rotary blower can further include a first rotor shaft and a second rotor shaft rotatably supported by the housing and having first and second rotors, respectively, fixed for rotation therewith. The manifold can direct the air from the rotary blower into an engine air filter in a direction opposite an air intake direction through the engine air filter. The air from the rotary blower can urge debris away from the engine air filter.

According to additional features the air can be delivered from the rotary blower on an intermittent basis. The air delivery system can further include a valve disposed in the manifold that is selectively actuated by a controller to control a timing of the intermittent blasts. The inlet port can extend along an inlet port axis and the outlet port can extend along an outlet port axis. The inlet port axis and the outlet port axis can be parallel. The inlet port can be defined by an inlet cylinder provided on the housing. The inlet port can define a circular cross section. The outlet port can be defined by an outlet cylinder provided on the housing. The outlet port can define a circular cross section.

A method of cooling a component on a farm machine according to one example of the present disclosure can include providing a rotary blower on the farm machine. A manifold can be provided that directs the air from the rotary blower. Air can be delivered from the rotary blower, through the manifold and onto the farm machine component. A temperature of the farm machine component can be reduced by the air from the rotary blower. According to an additional configuration, a valve can be provided in the manifold. The valve can be selectively actuated to modify a flow of air toward the farm machine component.

BRIEF DESCRIPTION OF THE DRAWINGS

The present disclosure will become more fully understood from the detailed description and the accompanying drawings, wherein.

DETAILED DESCRIPTION

Figure 1:
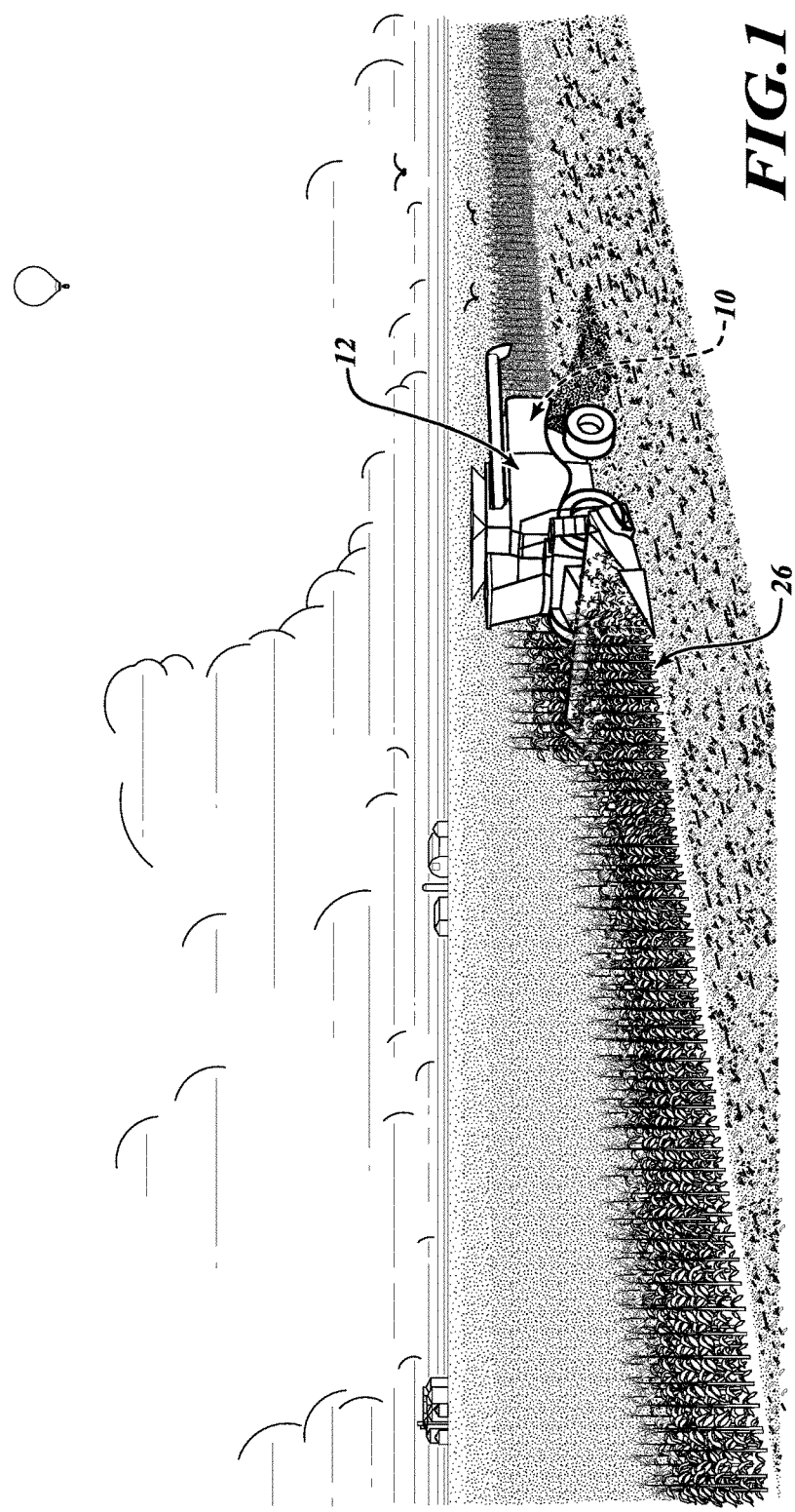
FIG. 1 is an environmental view of a farm machine incorporating an air delivery system according to one example of the present disclosure.
Figure 2:
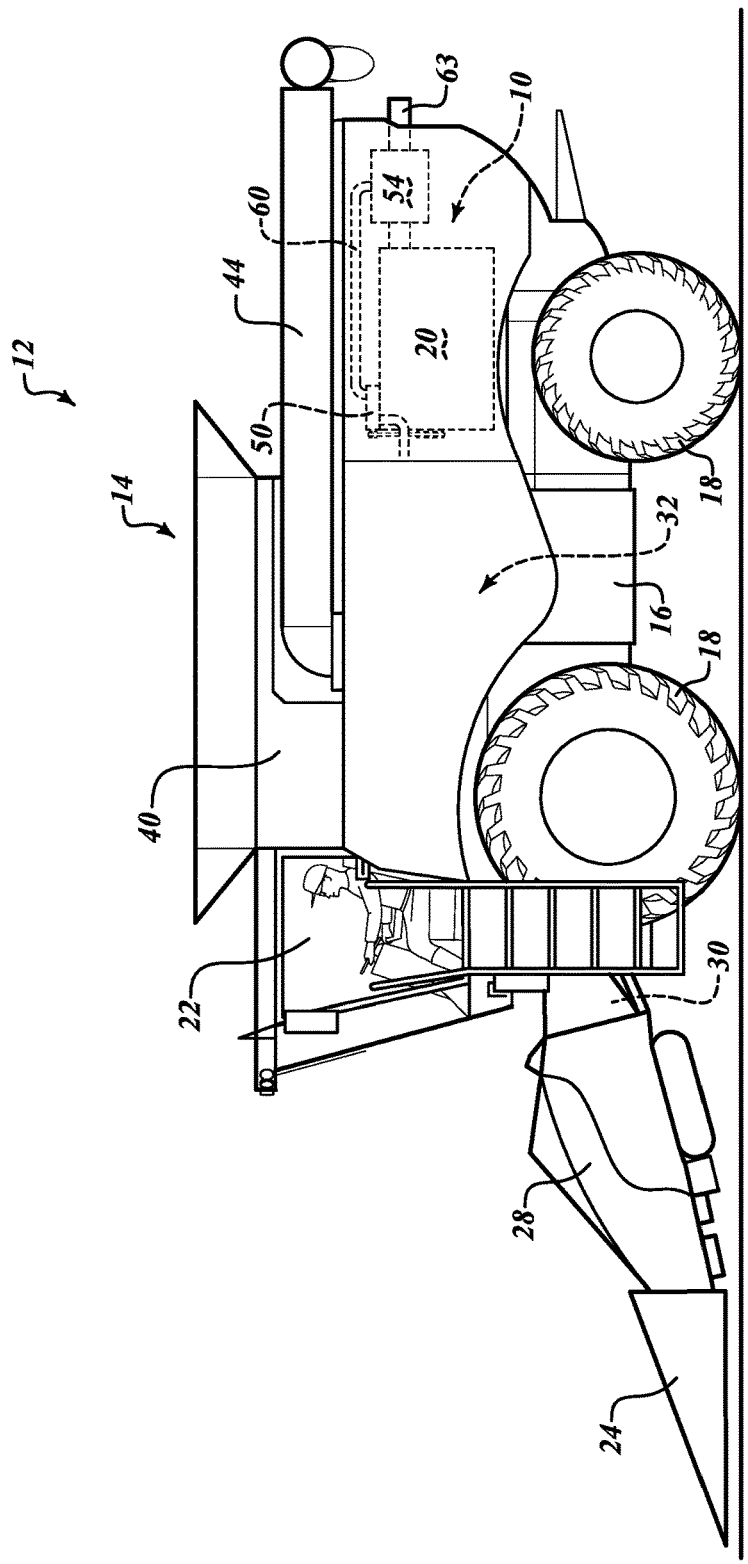
FIG. 2 is a side view of the farm machine of FIG. 1 that incorporates an air delivery system according to one example of the present disclosure.

With initial reference to FIGS. 1 and 2, an air delivery system constructed in accordance to one example of the present disclosure is shown and generally identified at reference numeral 10. The air delivery system 10 is shown operatively configured on a farm machine 12. The farm machine 12 described herein is in the form of a combine harvester 14. It will be appreciated however that the air delivery system 10 according to the present disclosure can be configured for use in other farm machines including various other harvesting equipment, hay making machines, loading machines, tractors and the like. As will become appreciated from the following discussion, the air delivery system 10 according to the present disclosure can reduce a temperature of engine exhaust ultimately emitted from the farm machine 12.

The exemplary combine harvester 14 generally includes a chassis 16 having wheels 18 that engage the ground. An engine 20 provides rotatable motion onto the wheels 18. The wheels 18 therefore serve to propel the farm machine 12 along the ground. It will be appreciated that any combination of the front and rear wheels 18 may be configured as drive wheels and steering wheels. The operation of the combine harvester 14 is controlled from an operator cab 22. A harvesting head 24 is mounted on the front end of the combine harvester 14 and is configured to gather corn plants 26 growing in an agricultural field and strip the ears of corn from the plant stalks. The plant stalks, once stripped of their ears of corn, are left on the ground. The ears of corn are carried through the harvesting head 24 and rearward through a feederhouse 28. The feederhouse 28 supports the harvesting head 24 on the combine harvester 14. In other examples, the plant stalks can be cut from the ground and the entire corn plant can be fed into the harvesting head 24 for further processing.

A conveyor 30 carries the ears of corn to a combine crop processing assembly 32. The combine crop processing assembly 32 can include a number of components that further process the ears of corn. In one example, the crop processing assembly 32 includes a thresher, a separator and a cleaner. The thresher and separator can cooperate to remove the grain from the stalks and husks. The cleaner can include a sieve and a chaffer that separate the grain from dust and chaff. Once cleaned, the clean grain can be deposited in an auger conveyor located in the bottom of the combine harvester 14. The clean grain can be moved by a paddle conveyor into a grain tank 40. The combine harvester 14 can be periodically unloaded through an unloading auger 44. Other configurations may be provided.

Figure 3:
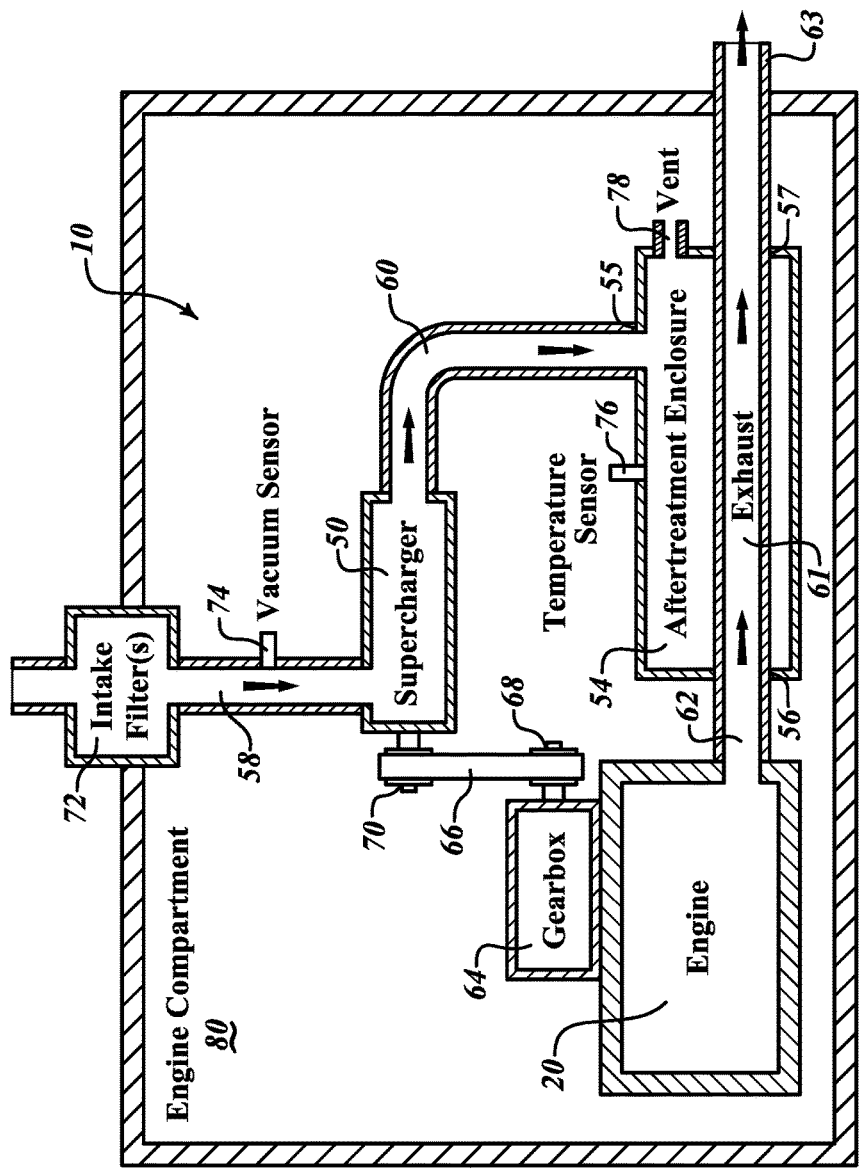
FIG. 3 is a schematic illustration of an air delivery system constructed in accordance to one example of the present disclosure.
Figure 4:
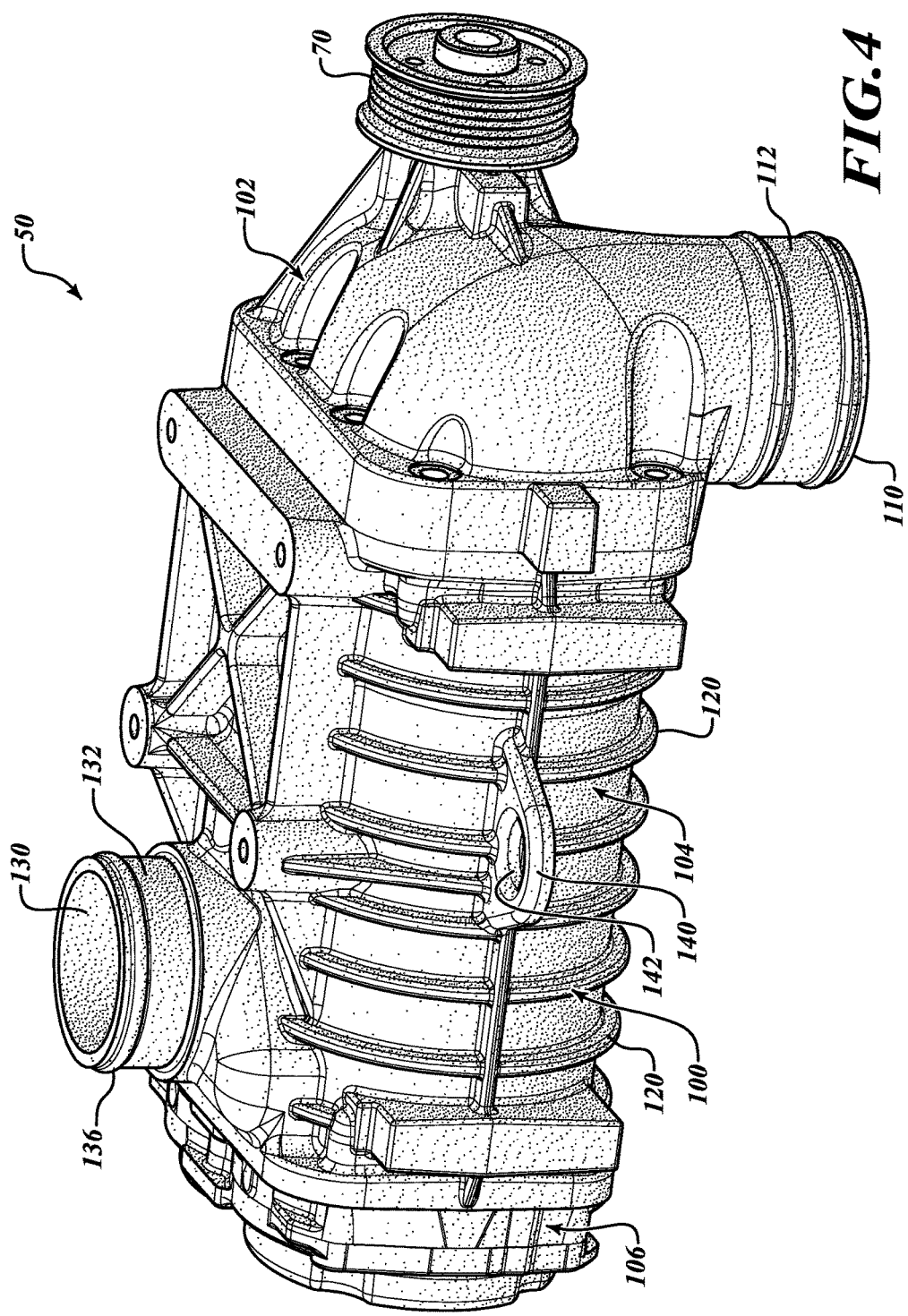
FIG. 4 is a front perspective view of an exemplary rotary blower of the air delivery system of FIG. 3.
Figure 5:
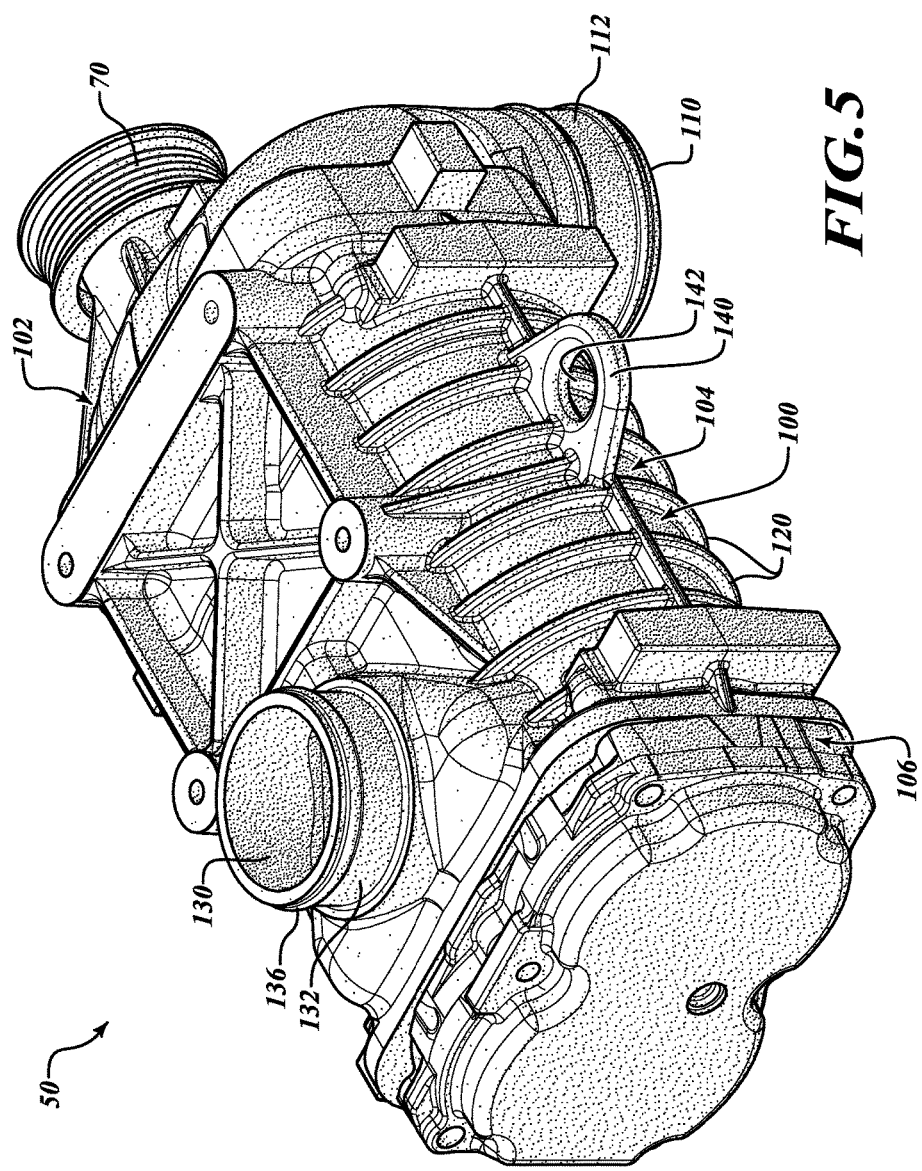
FIG. 5 is a rear perspective view of the exemplary rotary blower of FIG. 4.
Figure 6:
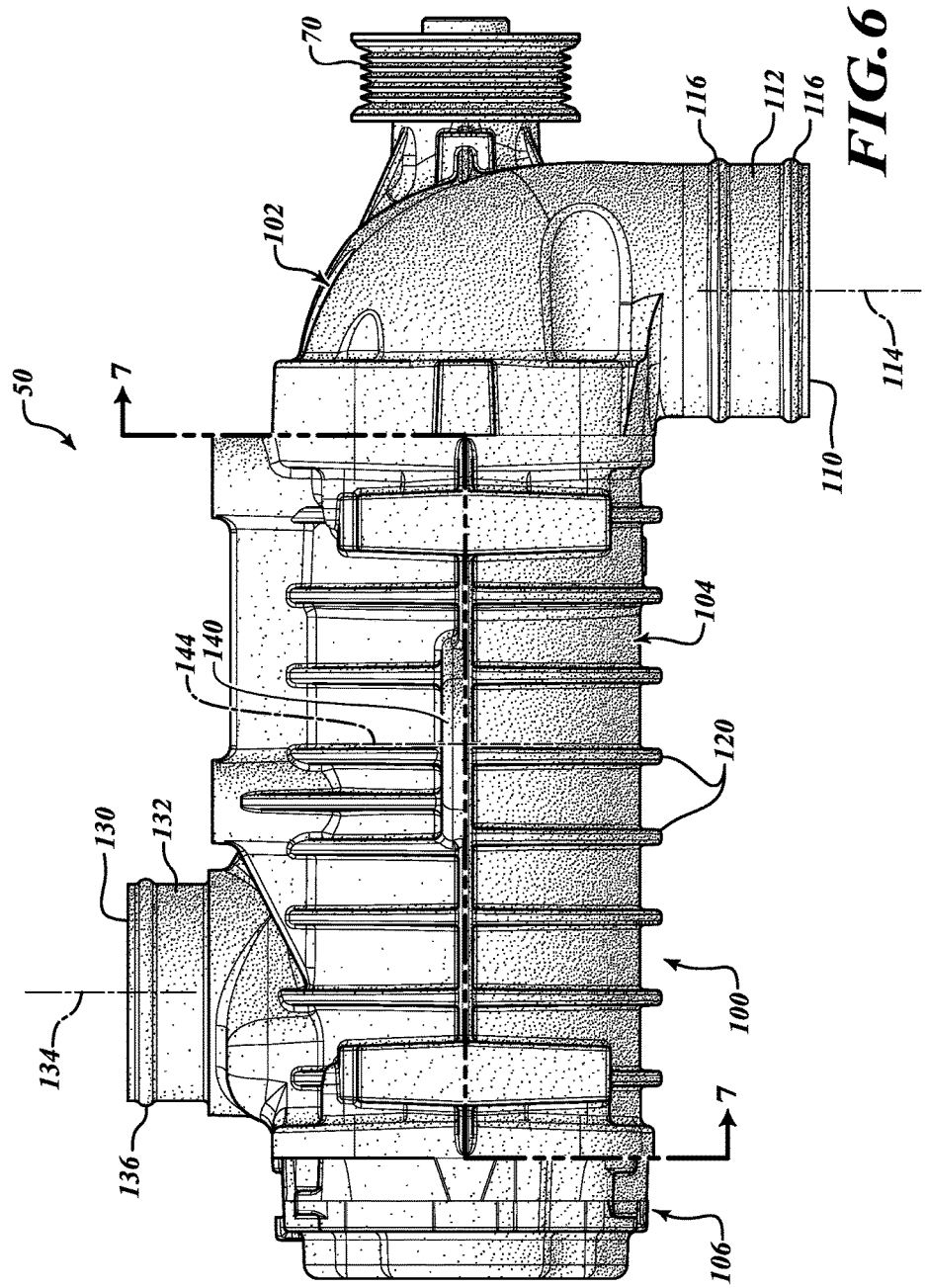
FIG. 6 is a side view of the exemplary rotary blower of FIG. 4.
Figure 7:
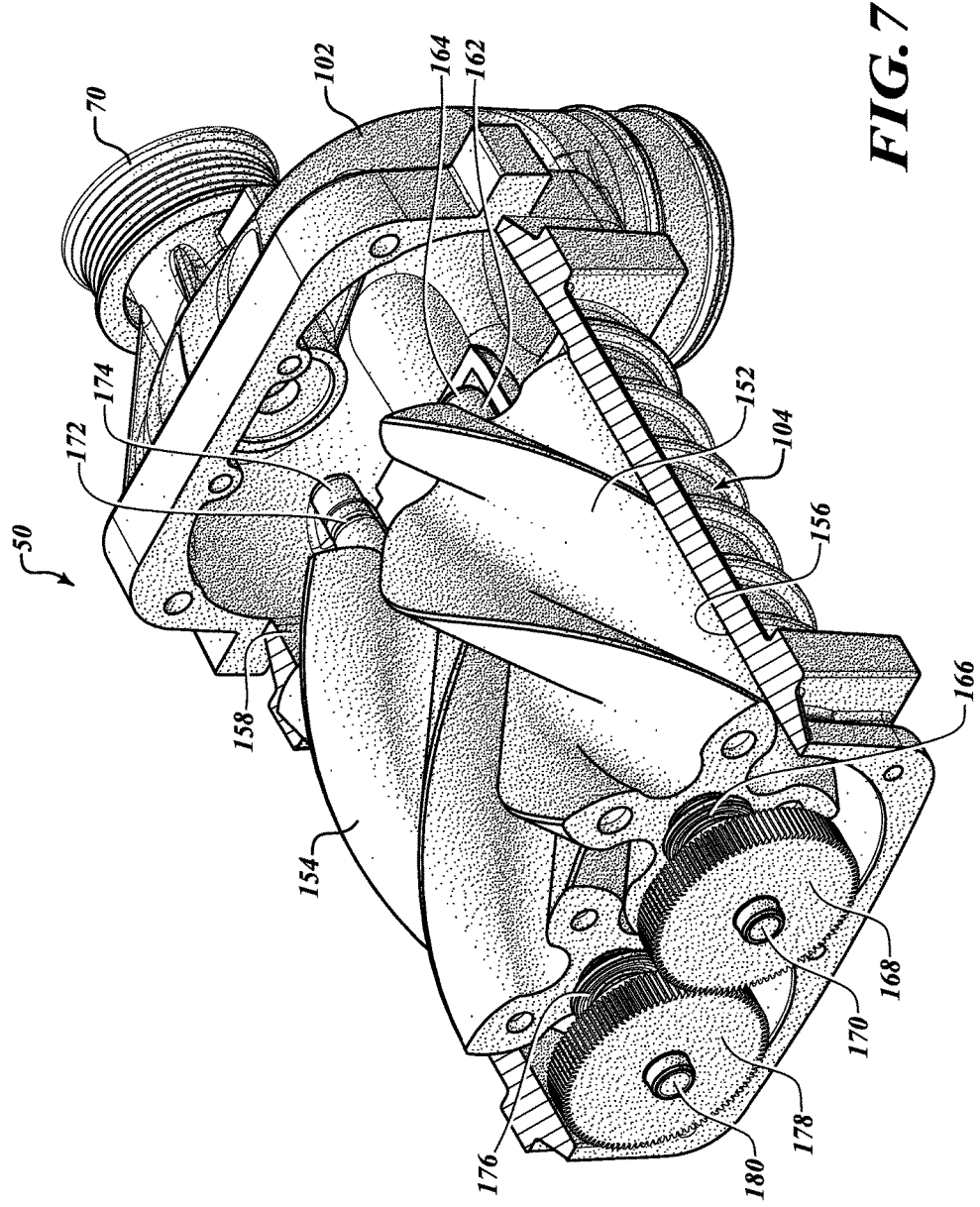
FIG. 7 is a cross-sectional view of the exemplary rotary blower taken along lines 7-7 of FIG. 6.

With additional reference to FIG. 3, the air delivery system 10 according to one example of the present disclosure will be described. The air delivery system 10 can generally include a positive displacement rotary blower or supercharger 50 of the Roots type and an aftertreatment enclosure 54. The aftertreatment enclosure 54 can have a first inlet 55, a second inlet 56 and an outlet 57. The supercharger 50 can be configured to force air from an air intake duct 58 through a supercharger outlet duct 60 and into the aftertreatment enclosure 54 by way of the first inlet 55. As will become appreciated from the following discussion, the supercharger 50 is configured to force air into the aftertreatment enclosure 54. One exemplary flow rate is 350 cubic feet per minute (cfm) although other flow rates are contemplated. The temperature of the air being forced into the aftertreatment enclosure 54 by the supercharger 50 is cooler than a temperature of an exhaust 61 of the engine 20. The cooler air delivered from the supercharger 50 reduces the temperature of the exhaust 61.

An engine exhaust duct 62 can deliver engine exhaust from the engine 20 through the aftertreatment enclosure 54 and out of the combine harvester 14 through an engine exhaust outlet 63. In the example shown, the engine exhaust duct 62 enters the aftertreatment enclosure 54 at the second inlet 56 and exits the aftertreatment enclosure 54 at the outlet 57. The cooler air (relative to exhaust temperature exiting the engine 20 upstream of the aftertreatment enclosure 54) provided by the supercharger 50 will be forced against the engine exhaust duct 62 and through convection will cause the temperature of the exhaust 61 to be reduced. As a result, the temperature of the exhaust 61 exiting the aftertreatment enclosure 54 through the engine exhaust duct 62 is less than the temperature of the exhaust 61 entering the aftertreatment enclosure 54. In this regard, the temperature of the exhaust exiting the combine harvester 14 at the exhaust outlet 63 is reduced compared to a temperature of the exhaust exiting the engine 20 upstream of the aftertreatment enclosure 54.

The supercharger 50 can be driven by a gearbox or power take off unit (PTU) 64 extending from the engine 20. A power transfer device such as a belt 66 can transfer a rotatable motion from a PTU pulley 68 driven by the PTU 64 to a supercharger pulley 70 arranged on the supercharger 50. Other mechanical arrangements may be incorporated for providing a rotatable input to the supercharger pulley 70.

An intake filter 72 can be configured upstream of the air intake duct 58. The intake filter 72 can filter ambient air flowing into the air intake duct 58. A vacuum sensor 74 can be provided on the air intake duct 58. The vacuum sensor 74 can be configured to measure a pressure in the air intake duct 58. A temperature sensor 76 can be provided on the aftertreatment enclosure 54. The temperature sensor 76 can be configured to measure a temperature in the aftertreatment enclosure 54. A vent 78 can be incorporated on the aftertreatment enclosure 54 that vents the aftertreatment enclosure 54 to ambient air. The air delivered from the supercharger 50 can exit the aftertreatment enclosure 54 through the vent 78. The aftertreatment enclosure 54 is sealed except for the vent 78. The air flow entering the aftertreatment enclosure 54 from the supercharger 50 has a greater pressure than ambient. In one example, the pressure in the aftertreatment enclosure 54 can be between 110 and 120 kilopascals (kPa). In general, atmospheric pressure can range between 95 and 105 kPa. As such, pressure in the aftertreatment enclosure 54 is higher than ambient. A pressure ratio of the aftertreatment enclosure 54 and atmospheric pressure can be about 1.1 to 1.2. In this regard, contaminants are inhibited from entering the aftertreatment enclosure 54 through the vent 78.

The vacuum sensor 74 and the temperature sensor 76 can be configured to communicate a signal to a controller (not specifically shown). The controller can be configured to make operational adjustments to the air delivery system 10 based on operational inputs including those provided by the vacuum sensor 74 and the temperature sensor 76. In the example shown, the air delivery system 10 is arranged within an engine compartment 80 although it will be appreciated that some or all of the components may be located elsewhere on the combine harvester 14.

With further reference now to FIGS. 4-7, the supercharger 50 will be further described. The supercharger 50 can generally include a supercharger housing 100 having a front housing portion 102, a central housing portion 104 and a rear housing portion 106. The front housing portion 102 can include an inlet port 110 defined by an inlet cylinder 112. The inlet port 110 can extend along an inlet port axis 114 (FIG. 6) and define a circular cross section. Mounting ribs 116 (FIG. 6) can extend around the inlet cylinder 112 for providing a mating structure for the air intake duct 58 (FIG. 3). The front housing portion 102 can provide mounting structure for the supercharger pulley 70.

The central housing portion 104 can include a plurality of cooling fins 120 extending therefrom. The central housing portion 104 can include an outlet port 130 defined by an outlet cylinder 132. The outlet port 130 can extend along an outlet port axis 134 (FIG. 6) and define a circular cross section. A mounting rib 136 can extend around the outlet cylinder 132 for providing a mating structure for the supercharger outlet duct 60 (FIG. 3).

The central housing portion 104 can include an eyelet 140 extending therefrom. The eyelet 140 can define an opening 142 having an axis 144 that is parallel to the inlet port axis 114 and the outlet port axis 134. The eyelet 140 can be monolithic or integrally formed with the central housing portion 104 and can be used, for example as a grasping or mounting point, to move the supercharger 50 during assembly.

The supercharger 50 includes a first rotor 152 and a second rotor 154, both of which include a plurality of meshed lobes. The rotors 152 and 154 are disposed in a pair of parallel, transversely overlapping cylindrical chambers 156 and 158, respectively defined in the central housing portion 104. The rotors 152 and 154 are driven mechanically by engine crankshaft torque transmitted through the belt 66. The first and second rotors 152 and 154 are driven at a fixed ratio thereby boosting or supercharging the air flowing from the inlet port 110 to the outlet port 130.

The first rotor 152 is fixedly mounted to a first rotor shaft 162 that is journalled for rotation in the supercharger housing 100. In one example, the first rotor shaft 162 includes a first end 164. A second end 166 of the first rotor shaft 162 includes a first spur gear 168 mounted thereon. A first rotor mounting hub 170 can be formed on the first spur gear 168. The first rotor mounting hub 170 can be rotatably journalled in a corresponding bore (not specifically shown) on the rear housing portion 106.

The second rotor 154 is fixedly mounted to a second rotor shaft 172 that is journalled for rotation in the supercharger housing 100. In one example, the second rotor shaft 172 includes a first end 174. A second end 176 of the second rotor shaft 172 includes a second spur gear 178 that is meshingly engaged to the first spur gear 168 for concurrent rotation. A second rotor mounting hub 180 can be formed on the second spur gear 178. The second rotor mounting hub 180 can be rotatably journalled in a corresponding bore (not specifically shown) on the rear housing portion 106.

Figure 8:
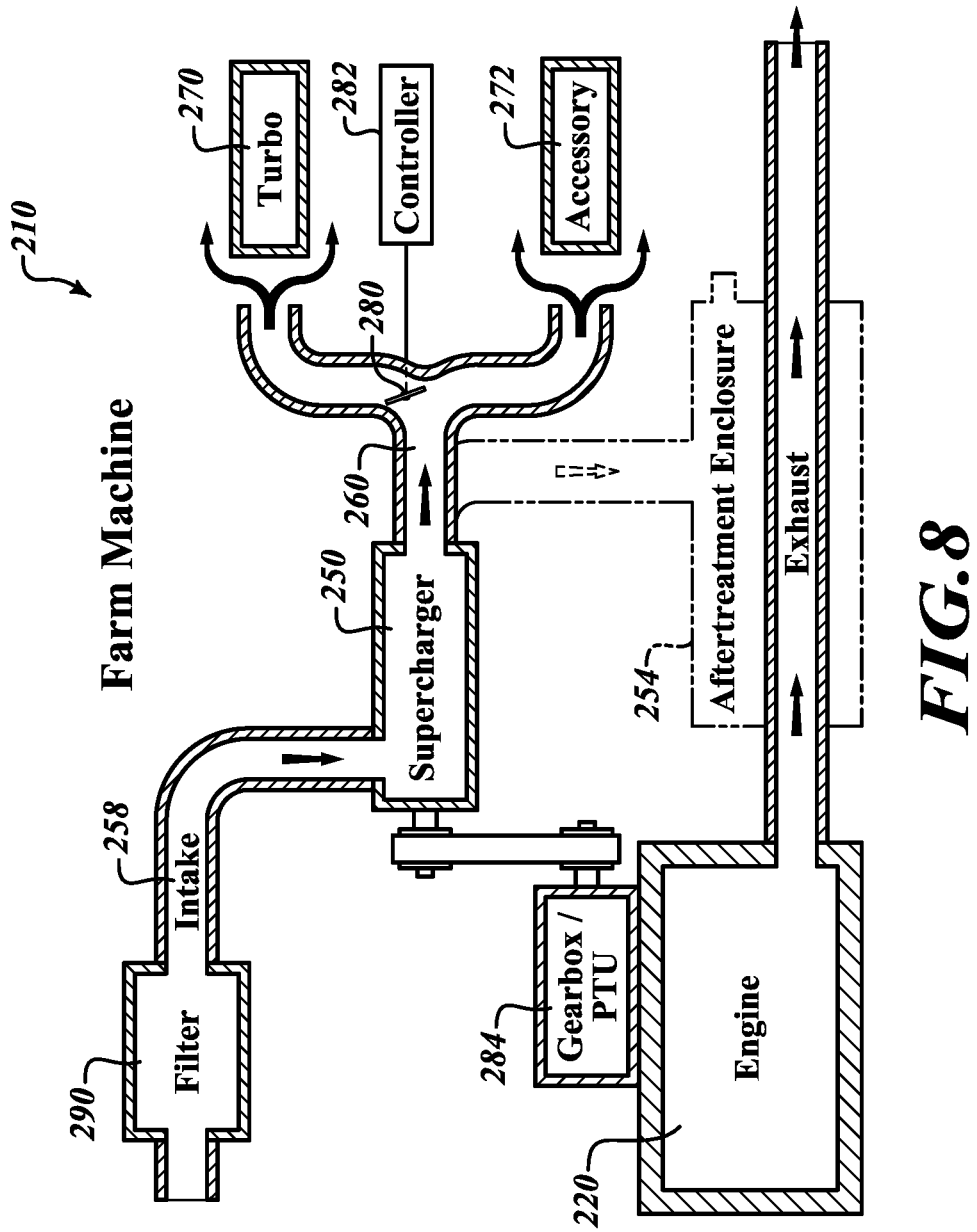
FIG. 8 is a schematic illustration of cooling system for a farm machine constructed in accordance to another example of the present disclosure.

With reference now to FIG. 8, a cooling system constructed in accordance to another example of the present disclosure is shown and generally identified at reference numeral 210. The cooling system 210 can generally include a supercharger 250 that can be configured to force air from an air intake duct 258 through a manifold 260 that directs air against a turbocharger 270 and an accessory 272. The air directed against the turbocharger 270 and the accessory 272 can cool the turbocharger 270 and accessory 272. The accessory 272 can be any component on a farm machine that needs to be cooled. By way of non-limiting example, the accessory 272 can include an engine accessory, engine oil, and/or engine coolant. It will be appreciated that the manifold 260 can be configured to direct air to only one of the turbocharger 270 and accessory 272. In one example, the supercharger 250 can be part of an exhaust air delivery system 254 such as described above.

The supercharger 250 can be driven by a gearbox or PTU 284 extending from the engine 220 similar to the configuration described above with the supercharger 50. In one configuration a valve such as a butterfly valve 280 can be incorporated in the manifold 260. The butterfly valve 280 can be selectively actuated by a controller 282 for modifying the ratio of air delivered to the turbocharger 270 and the accessory 272. An air filter 290 can be configured upstream of the intake 258 for filtering the air entering the supercharger 250.

Figure 9:
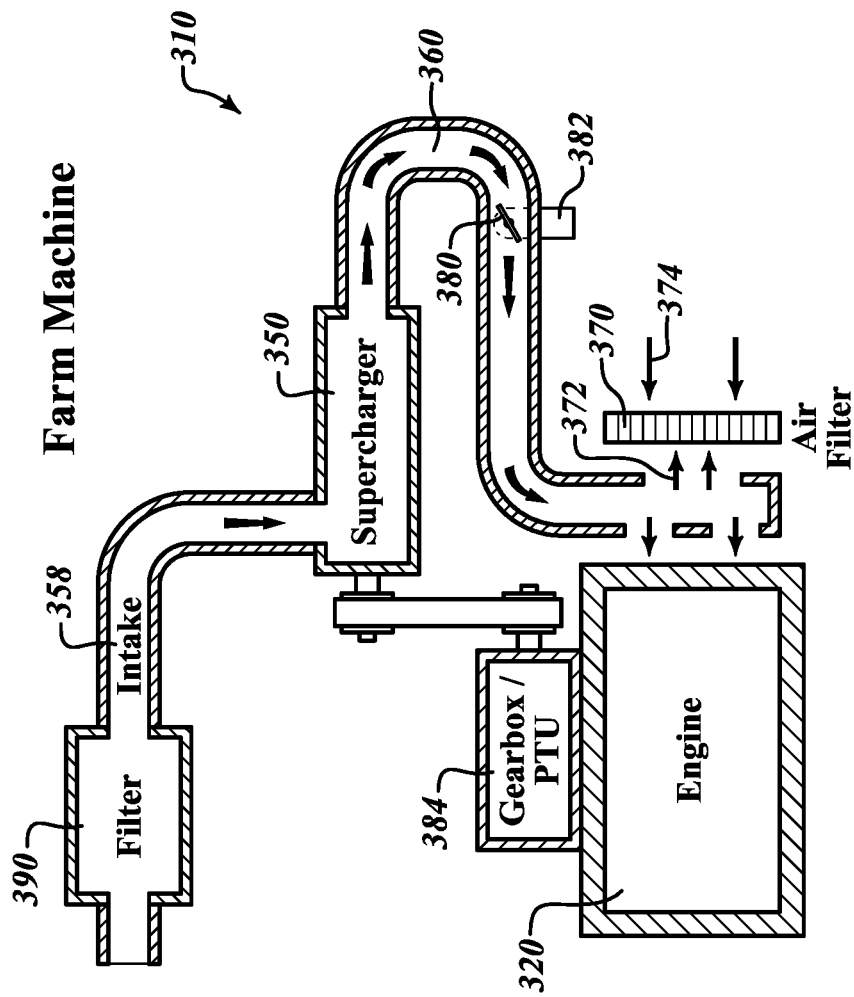
FIG. 9 is a schematic illustration of an air delivery system including an air filter cleaning system for a farm machine constructed in accordance to another example of the present disclosure.

With reference now to FIG. 9, an air delivery system constructed in accordance to one example of the present disclosure is shown and generally identified at reference numeral 310. The air delivery system 310 can include a supercharger 350 that can be configured to force air from an air intake duct 358 through a manifold 360 that directs air into an engine air filter 370. Specifically, the manifold 360 directs air in a direction 372, opposite a direction 374 of air intake into the engine 330 to clean the engine air filter 370. Explained further, as air is directed into the engine 330, the air can be first routed through the air filter 370. Over time, the air filter 370 can collect dirt and debris ultimately reducing the flow of air permissible through the air filter 370. When air is forced from the supercharger 350 in the direction 372, such dirt and debris can be urged out of or away from the air filter 370 increasing the life of the air filter 370. In some examples, the air from the supercharger 350 can be sent in intermittent blasts. A valve 380 can be incorporated that is actuated by a controller 382 to control the timing of such air blasts. While not specifically shown, the supercharger 350 can be part of an air delivery system such as described above.

The supercharger 350 can be driven by a gearbox or PTU 384 extending from the engine 320 similar to the configuration described above with the supercharger 50. An air filter 390 can be configured upstream of the intake 358 for filtering the air entering the supercharger 350.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cooling system for cooling portions of a farm machine, the cooling system comprising:

a rotary blower including a housing and having a first rotor and a second rotor rotatably disposed in the housing, the first and second rotors having meshed lobes for transporting air from an inlet port to an outlet port, the rotary blower further including a first rotor shaft and a second rotor shaft rotatably supported by the housing and having the first and second rotors, respectively, fixed for rotation therewith; and a manifold coupled to the outlet port of the rotary blower and branching into a first branch conduit and a second branch conduit, wherein the first branch conduit directs a first portion of cooling air from the rotary blower onto a first component for cooling thereof, and wherein the second branch conduit directs a second portion of cooling air from the rotary blower onto a second component for cooling thereof.

2. The cooling system of claim 1 wherein the first component comprises a turbocharger.

3. The cooling system of claim 2 wherein the second component comprises at least one of an engine accessory, engine oil and engine coolant.

4. The cooling system of claim 3 further comprising a valve that is disposed in the manifold and selectively actuated by a controller for modifying a ratio of air delivered to the first and second components.

5. The cooling system of claim 1 wherein the inlet port extends along an inlet port axis and the outlet port extends along an outlet port axis, wherein the inlet port axis and the outlet port axis are parallel.

6. The cooling system of claim 5 wherein the inlet port is defined by an inlet cylinder provided on the housing, and wherein the inlet port defines a circular cross section.

7. The cooling system of claim 5 wherein the outlet port is defined by an outlet cylinder provided on the housing, and wherein the outlet port defines a circular cross section.

8. The cooling system of claim 5 wherein the housing comprises an eyelet extending therefrom, the eyelet defining an opening having an axis that is parallel to the inlet port axis and the outlet port axis.

9. The cooling system of claim 1, further comprising an aftertreatment system including:
a first aftertreatment enclosure configured on the farm machine and having a first inlet, a second inlet and an outlet, wherein the first inlet receives engine exhaust from an engine of the farm machine and the second inlet receives air from the rotary blower and wherein a temperature of the engine exhaust is reduced upon exiting the first aftertreatment enclosure through the outlet.

10. The cooling system of claim 1 wherein the farm machine comprises a combine.

11. An air delivery system for a farm machine, the air delivery system comprising:
a rotary blower including a housing and having a first rotor and a second rotor rotatably disposed in the housing, the first and second rotors having meshed lobes for transporting air from an inlet port to an outlet port, the rotary blower further including a first rotor shaft and a second rotor shaft rotatably supported by the housing and having the first and second rotors, respectively, fixed for rotation therewith; and
a manifold that directs the air from the rotary blower into an engine air filter in a direction opposite an air intake direction through the engine air filter, wherein the air from the rotary blower urges debris away from the engine air filter.

12. The air delivery system of claim 11 wherein the air is delivered from the rotary blower in intermittent blasts.

13. The air delivery system of claim 11, further comprising a valve disposed in the manifold that is selectively actuated by a controller to control a timing of the intermittent blasts.

14. The air delivery system of claim 11 wherein the inlet port extends along an inlet port axis and the outlet port extends along an outlet port axis, wherein the inlet port axis and the outlet port axis are parallel.

15. The air delivery system of claim 11 wherein the inlet port is defined by an inlet cylinder provided on the housing and wherein the inlet port defines a circular cross section, and wherein the outlet port is defined by an outlet cylinder provided on the housing and wherein the outlet port defines a circular cross section.

16. A method of cooling portions of a farm machine, the method comprising:
providing a rotary blower on the farm machine;
providing a manifold that directs air from the rotary blower through a first branch conduit and a second branch conduit;
delivering a first portion of cooling air from the rotary blower, through the manifold first branch conduit and onto a turbocharger to thereby cool the turbocharger; and
delivering a second portion of cooling air from the rotary blower, through the manifold second branch conduit and onto a component to thereby cool the component, wherein the component is at least one of an engine accessory, engine oil, and engine coolant.

17. The method of claim 16, further comprising:
providing a valve in the manifold; and
selectively actuating the valve to modify an air flow ratio between the first and second branch conduits.

18. The method of claim 16, further comprising:
providing an aftertreatment enclosure having a first inlet, a second inlet, a first outlet, and a second outlet;
providing the manifold with a third branch conduit fluidly coupled to the aftertreatment enclosure;
delivering engine exhaust through an exhaust duct into the first inlet and out of the first outlet of the aftertreatment enclosure; and
delivering a third portion of cooling air from the rotary blower, through the manifold third branch conduit and into the second inlet and out of the second outlet of the aftertreatment enclosure to cool the engine exhaust in the exhaust duct.

19. The cooling system of claim 1, wherein the rotary blower is a Roots type supercharger operably coupled to the engine by a mechanical power transfer device.

20. The cooling system of claim 1, further comprising an aftertreatment enclosure configured to receive an exhaust duct and having a first inlet, a second inlet, a first outlet, and a second outlet, wherein the first inlet receives engine exhaust from an engine and the second inlet receives a third portion of cooling air from the rotary blower to reduce a temperature of the engine exhaust passing through the aftertreatment enclosure, wherein the engine exhaust exits the first aftertreatment enclosure through the first outlet, and the third portion of cooling air is vented to ambient through the second outlet, and
wherein the manifold includes a third branch conduit coupled to the second inlet of the aftertreatment enclosure to supply the third portion of cooling air thereto.

* * * * *